April 14, 1931.　　　　G. H. HORNE　　　1,800,529
METHOD AND APPARATUS FOR ELECTRICAL PRECIPITATION
Filed Feb. 27, 1929　　11 Sheets-Sheet 6
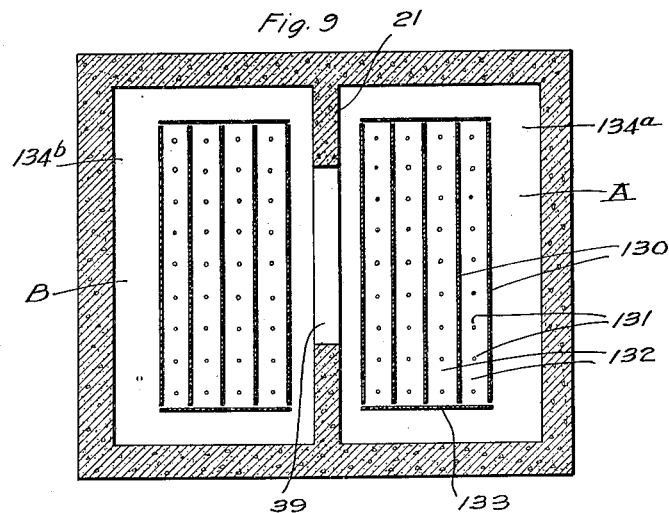
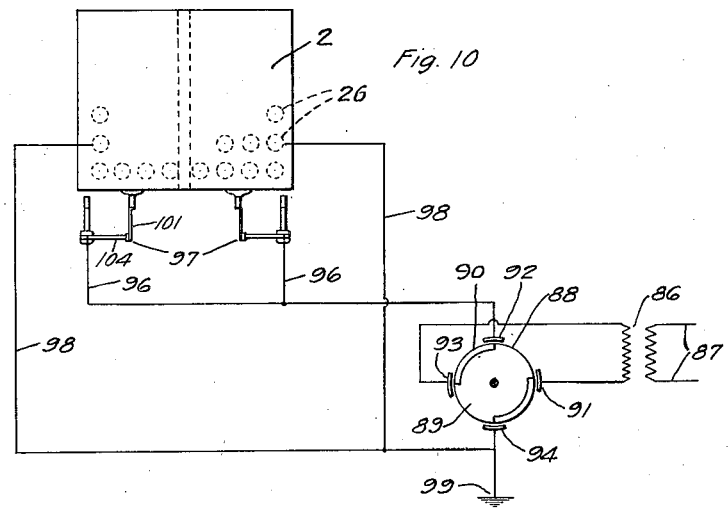
INVENTOR.
George H. Horne,
BY Arthur P. Knight and
Alfred W. Knight
ATTORNEYS

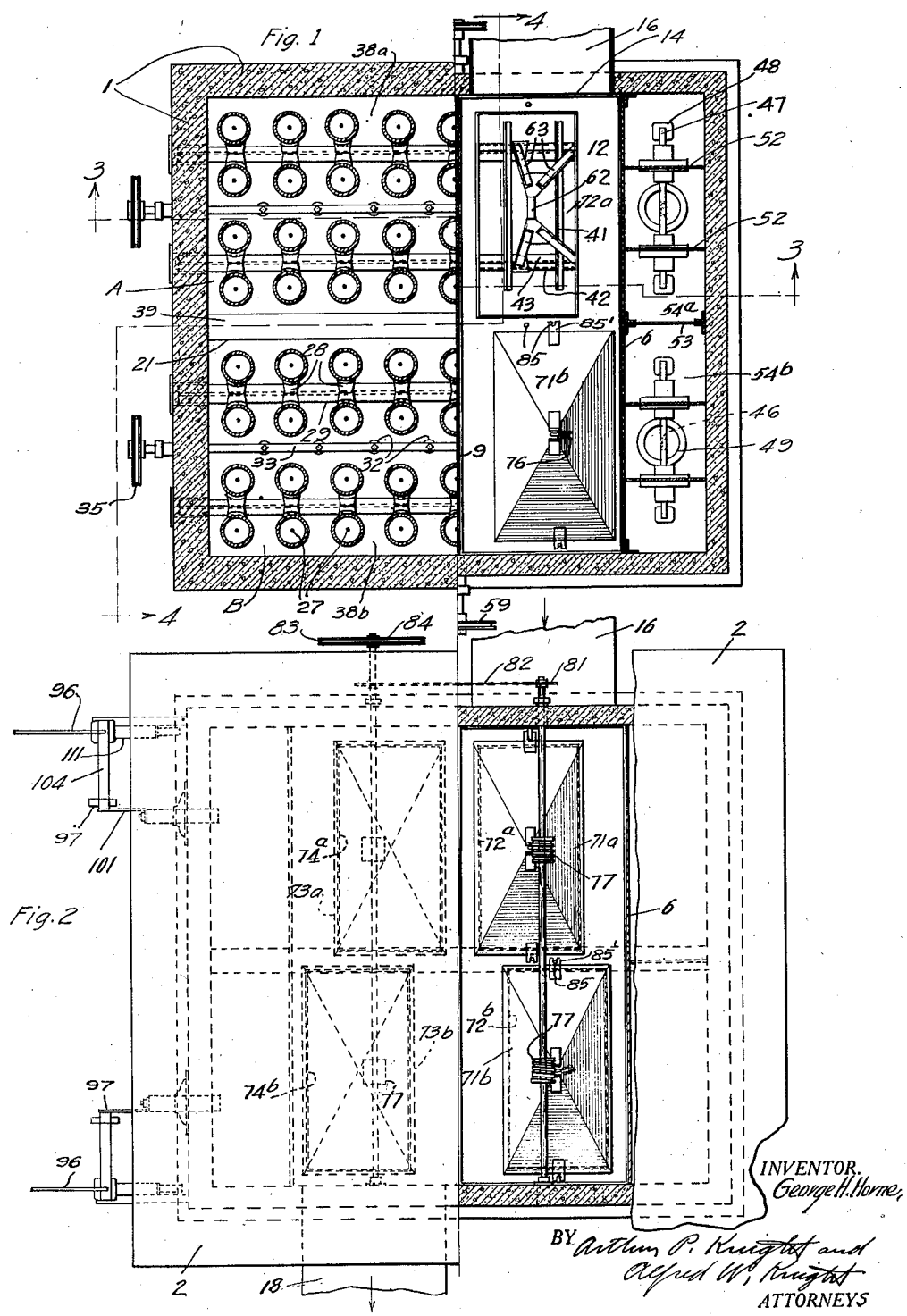

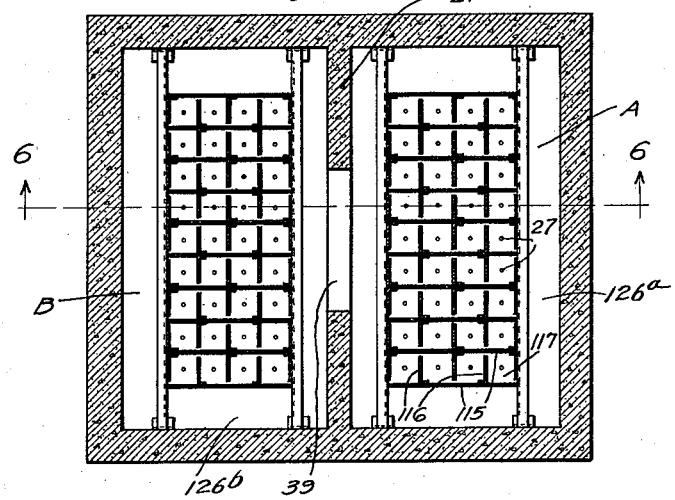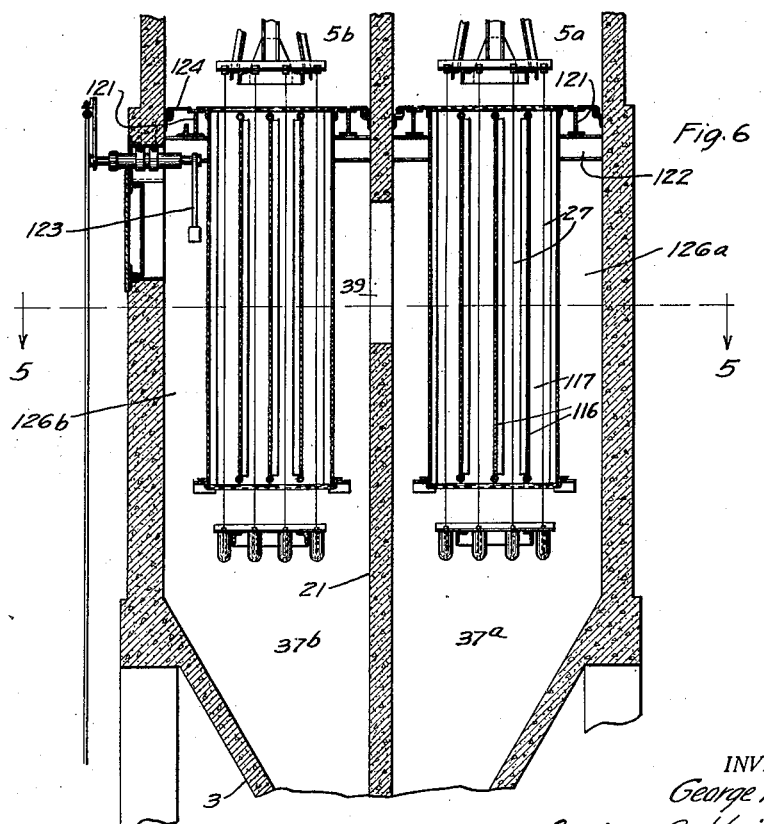

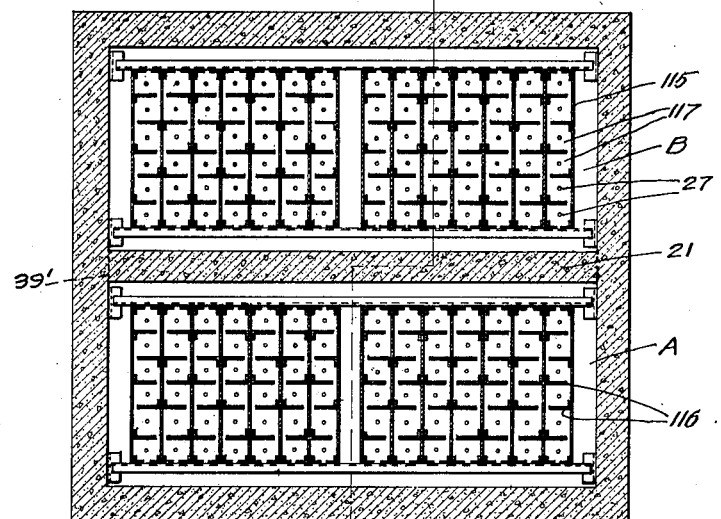
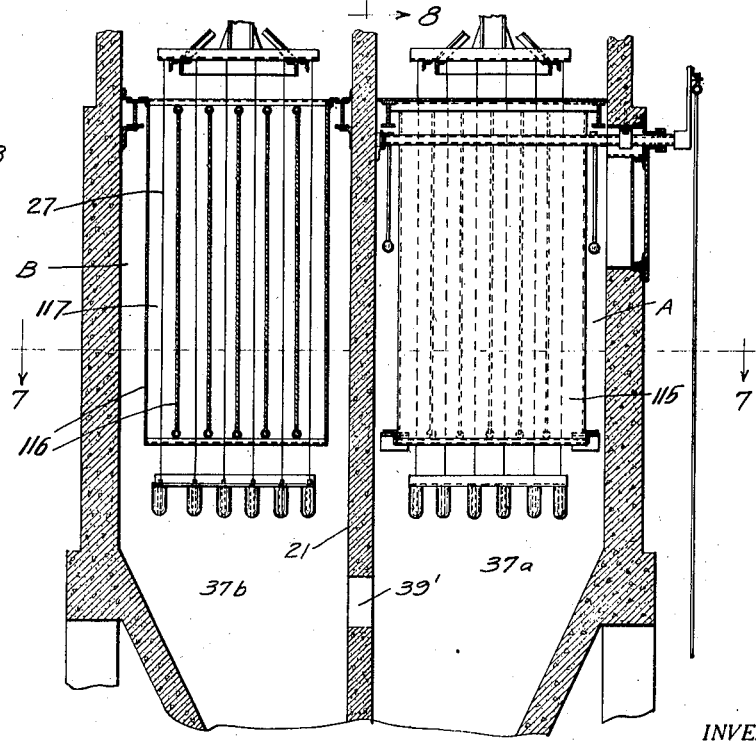

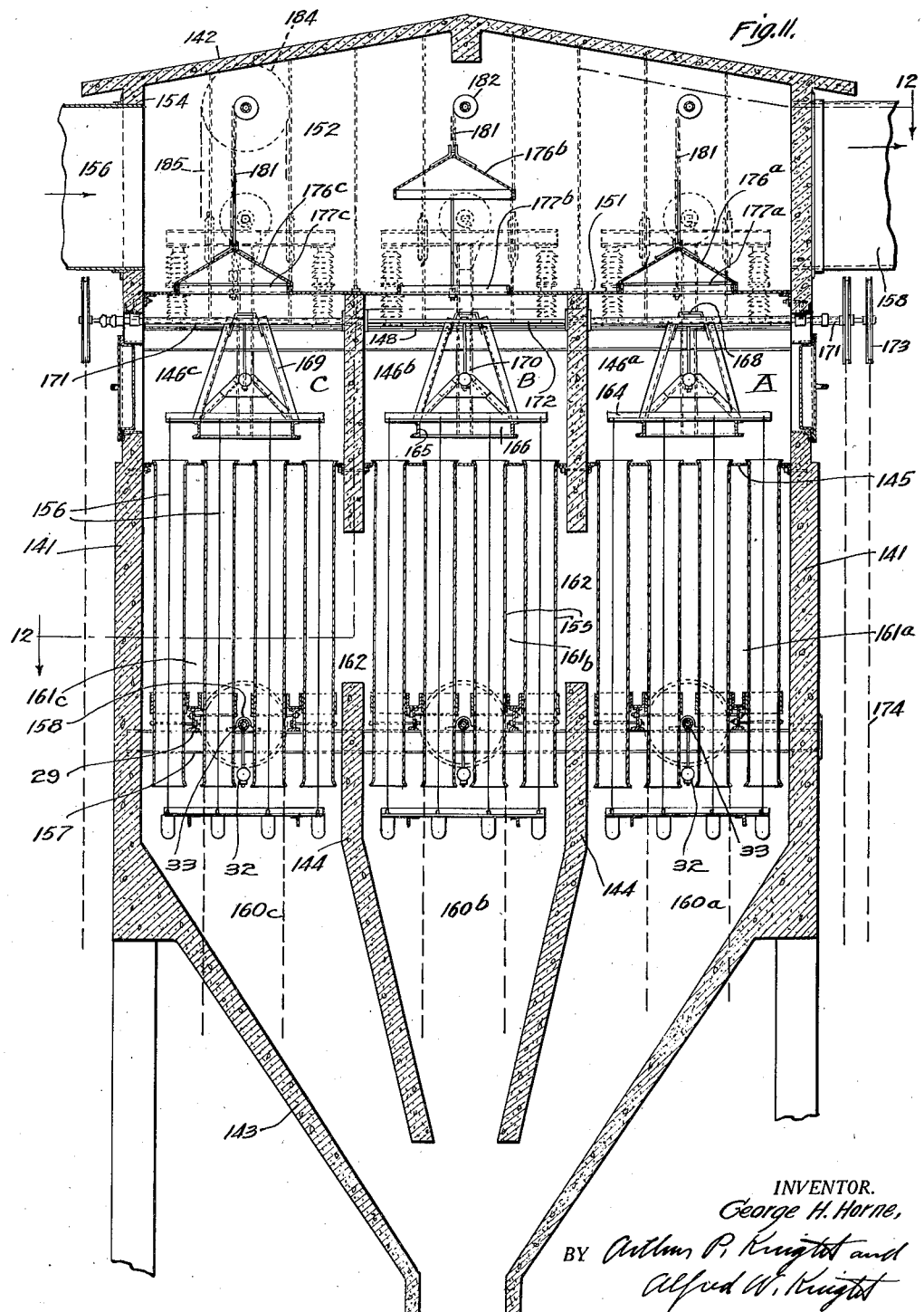

April 14, 1931. G. H. HORNE 1,800,529
METHOD AND APPARATUS FOR ELECTRICAL PRECIPITATION
Filed Feb. 27, 1929 11 Sheets-Sheet 8

INVENTOR.
George H. Horne,
BY Arthur P. Knight and
Alfred W. Knight
ATTORNEYS

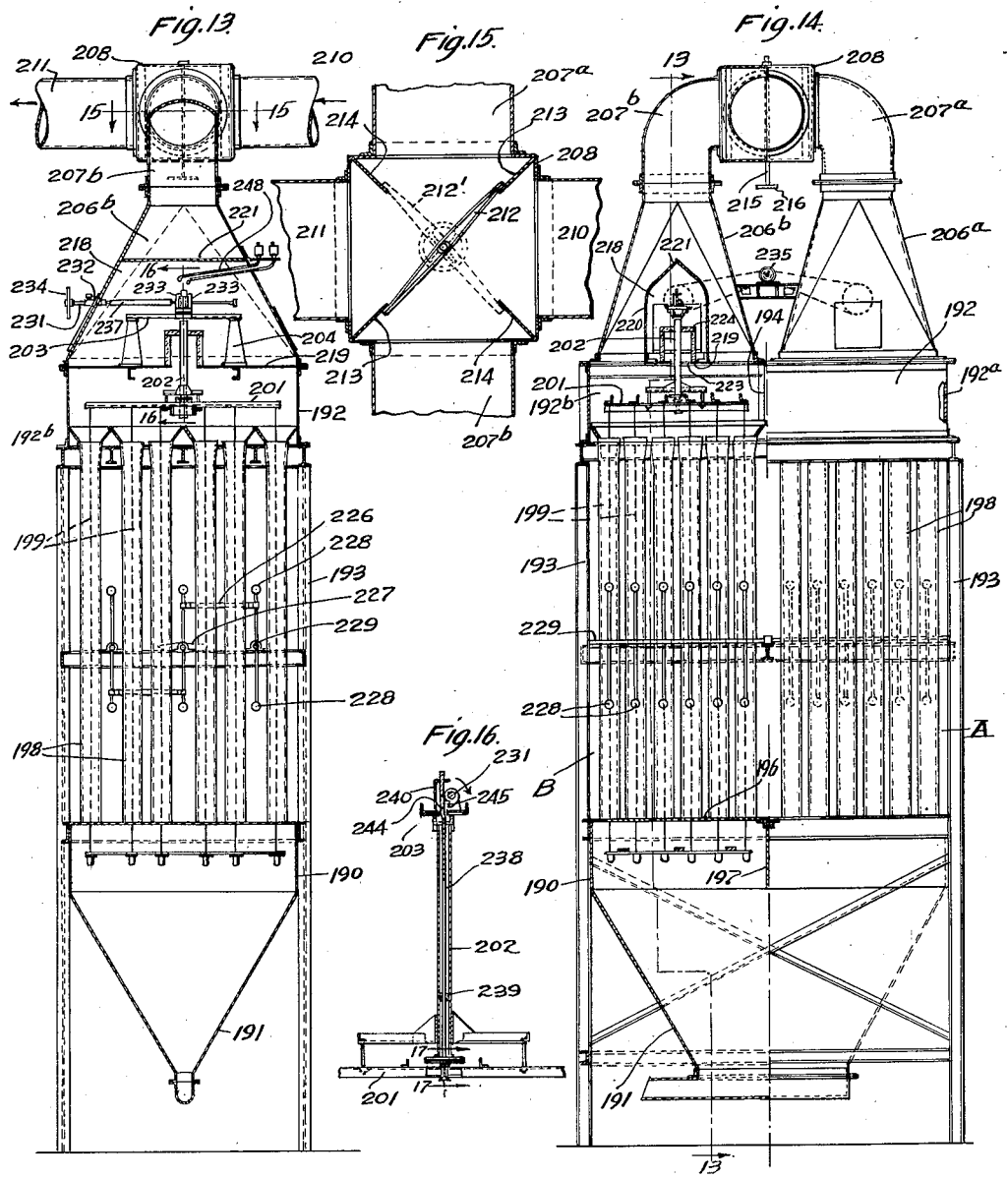

April 14, 1931.  G. H. HORNE  1,800,529
METHOD AND APPARATUS FOR ELECTRICAL PRECIPITATION
Filed Feb. 27, 1929  11 Sheets-Sheet 10
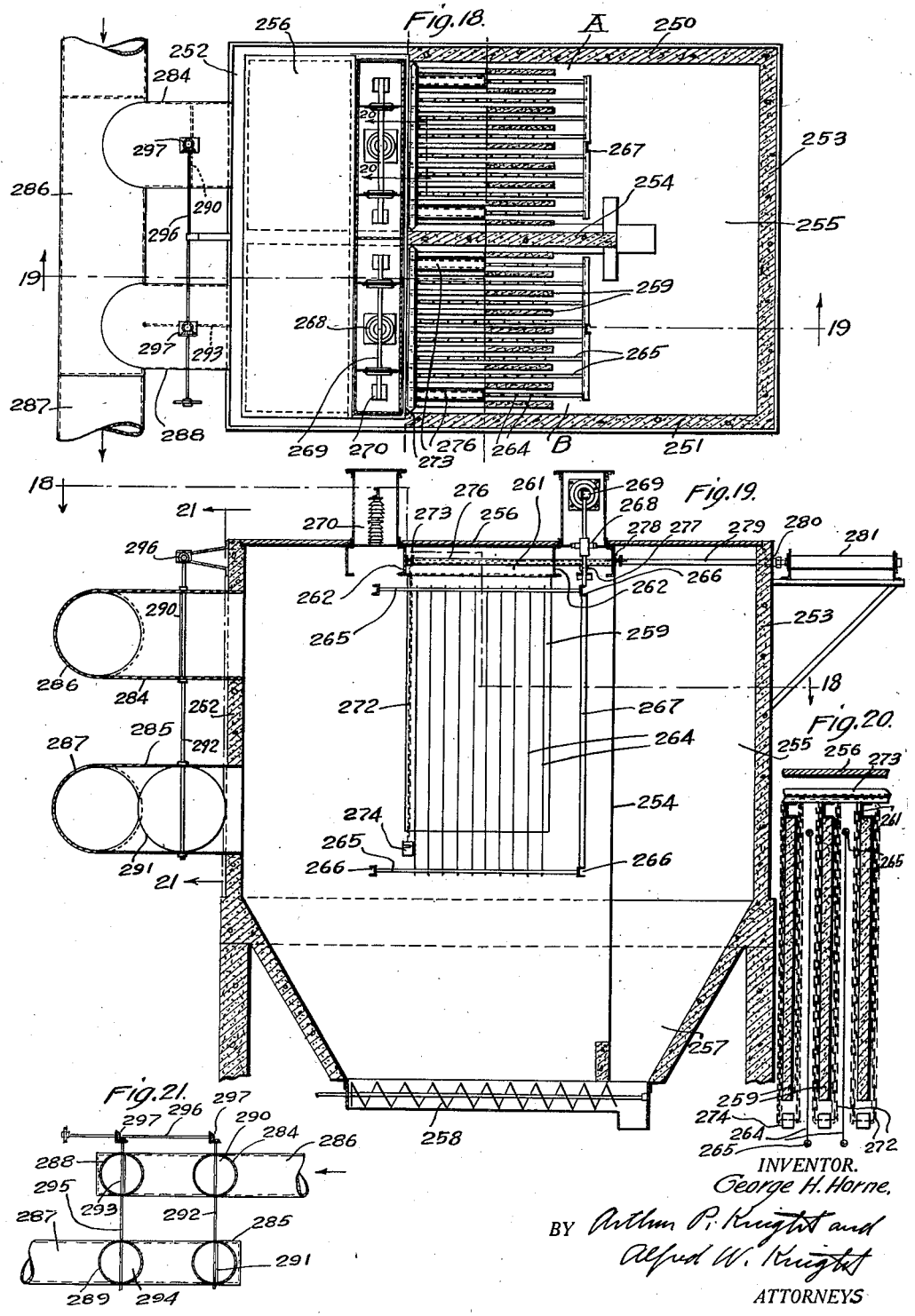
INVENTOR.
George H. Horne,
BY Arthur P. Knight and
Alfred W. Knight
ATTORNEYS April 14, 1931. G. H. HORNE 1,800,529
METHOD AND APPARATUS FOR ELECTRICAL PRECIPITATION
Filed Feb. 27, 1929 11 Sheets-Sheet 11
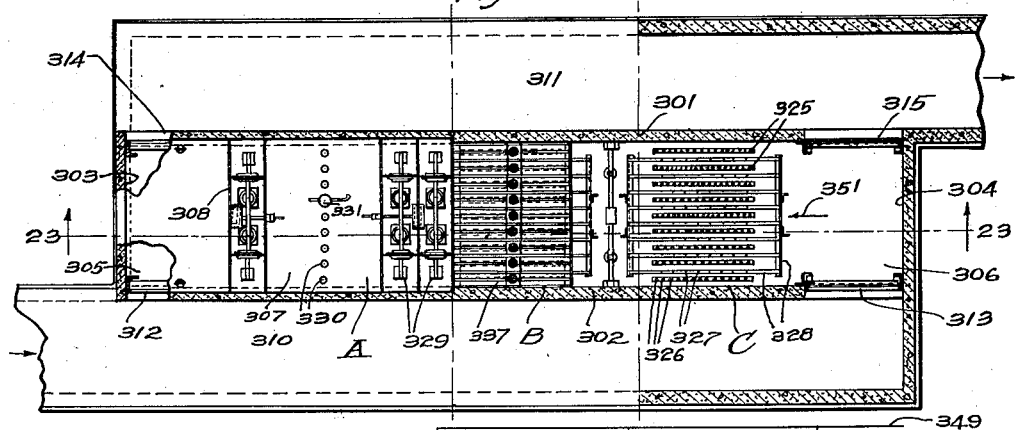
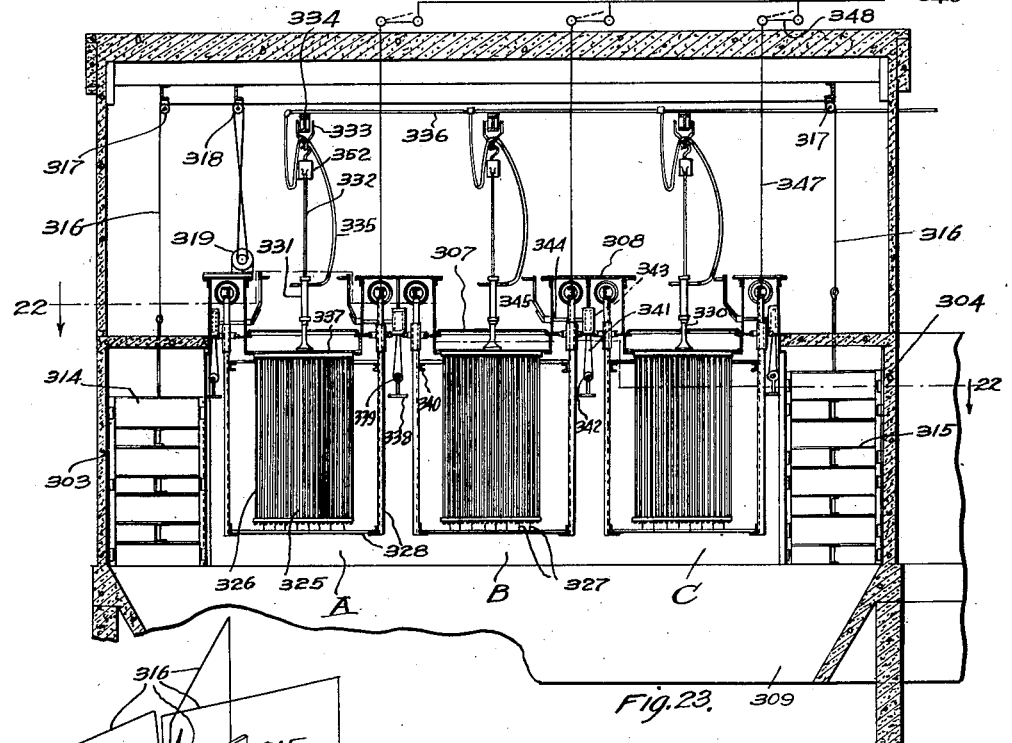
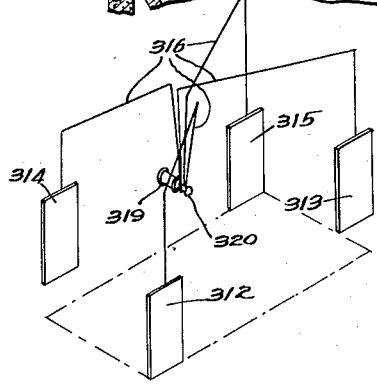
INVENTOR.
George H. Horne,
BY
ATTORNEYS Patented Apr. 14, 1931

1,800,529

UNITED STATES PATENT OFFICE

GEORGE H. HORNE, OF GLENDALE, CALIFORNIA, ASSIGNOR TO INTERNATIONAL PRECIPITATION COMPANY, OF LOS ANGELES, CALIFORNIA, A CORPORATION OF CALIFORNIA

METHOD AND APPARATUS FOR ELECTRICAL PRECIPITATION

Application filed February 27, 1929. Serial No. 343,108.

This invention relates to the electrical precipitation of suspended particles from gases, in which the particle-laden gas is passed through precipitating elements comprising opposing electrodes between which is maintained a high electric potential, one of the electrode means, known as the discharge electrodes, being adapted to produce electric discharge therefrom under such conditions, whereby the particles become electrically charged and are precipitated upon the other electrode means, which may be called the collecting electrodes.

The principal object of the invention is to provide an apparatus of this type having certain novel and advantageous features of construction, and a novel method of operation thereof, whereby the operating efficiency of the apparatus is increased.

A particular object of the invention is to prevent loss, in the exit gases from the apparatus, of solid particles which have been precipitated upon the electrodes but which become dislodged therefrom when the electrodes are cleaned, as by rapping, jarring or scraping the same. In most cases of electrical precipitation of solid particles, the precipitated material has more or less of a tendency to cling to the surface of the collecting electrodes and also in some cases to the discharge electrodes. While some of this precipitated material falls by its own weight from the electrode surfaces and into the hoppers or other collecting means usually provided beneath the electrodes, there is in general a tendency for such material, and particularly certain kinds of material, to gradually accumulate or build up on the electrodes, thus reducing the distance between the electrodes and causing the surfaces of the deposited material to become irregular, which may lead to the occurrence of disruptive discharges and seriously reduce the precipitating efficiency of the apparatus. Furthermore, if this adhering material is of low electrical conductivity, there is a tendency for electric charges to accumulate at the surface thereof, leading to further difficulties and loss of efficiency. It is customary, therefore, to provide cleaning means, such as suitable manually, mechanically, pneumatically or electrically operated hammering or jarring means, or scraping means, whereby the electrodes may be periodically subjected to a rapping or jarring action, or to a scraping or other cleaning action, to dislodge this deposited material therefrom and clean the electrodes. If the gas flow is continued through the apparatus during this cleaning operation, a considerable portion of the deposited material loosened from the plates by such action is, in general, picked up by the gas stream and, in the usual type of precipitating apparatus, such material is carried by the gas stream out of the precipitator and either allowed to escape to the atmosphere or deposited at some subsequent point. Furthermore, when cleaning the discharge electrodes, it is customary in many installations to shut off the supply of current thereto, in order to prevent short-circuiting through the cleaning mechanism, so that the precipitator, or the section being cleaned, is inactive for precipitating purposes during this time, which leads to a further loss of material if the gas flow is continued therethrough. It has therefore been necessary, in most cases, to interrupt the flow of gas through the precipitator, or through sections thereof, during the time of cleaning the electrodes therein. As stated above, an important object of this invention is to provide a precipitating apparatus in which this rapping, jarring, or other cleaning operation may be carried out without interruption of gas flow therethrough and without causing the material dislodged by such cleaning action, and material remaining unprecipitated due to interruption of the electric field, to be carried by the gas stream out of the precipitating apparatus.

A further object of the invention is to provide, in connection with an electrical precipitator in which the gas to be treated is passed first downwardly in one portion of the precipitator and then upwardly in another portion, improved means for re-distributing the gas before its upward passage in the last-named portion.

The method of my invention comprises essentially passing the gas to be treated successively through a plurality of precipitating elements in series, periodically reversing or varying the sequence of gas flow through the respective precipitating elements, and, between successive times of change in sequence of gas flow, cleaning the electrode means of a precipitating element, which is at that time other than the last element in the sequence of gas flow. In practice, it is of course customary, in order to handle the necessary large volume of gas, to pass the gas through a plurality of precipitating elements in parallel, in each section of the apparatus, so that in its usual practical embodiment, the method consists in passing the gas in series through a plurality of these multi-element sections in series, periodically varying the sequence of gas flow through the respective sections, and cleaning the electrode means of all the elements of each section during a period when that section is other than the last in the sequence of gas flow.

The electrical precipitating apparatus according to my invention, or each unit of such an apparatus, comprises in its simplest form a plurality of precipitating elements adapted for passage of gas therethrough in series (there being in any case two or more precipitating elements in series), means for independently cleaning the electrode means of the respective precipitating elements, and means for periodically varying the sequence of gas flow through the respective precipitating elements, whereby each precipitating element may during certain periods be other than the last in sequence of gas flow so as to permit cleaning of the electrode means therein during such periods, without interruption of gas flow during such cleaning operation. As stated above, the apparatus as actually constructed in practice, ordinarily comprises a plurality of sections, each including a number of precipitating elements in parallel, independently operable electrode cleaning means for the respective sections, means for passing gas to be treated through the respective sections in series, and means for periodically varying the sequence of gas flow through the sections.

According to a preferred embodiment of the invention, a plurality of multi-element sections are provided, adapted for vertical flow of gas therethrough and communicating with one another at their lower ends, and means are further provided for controlling communication between the upper ends of the respective sections and the gas inlet and outlet means so as to cause the gas to pass at certain times first downwardly in one of said sections and then upwardly in the remaining section or sections and at other times downwardly in another of said sections and then upwardly in the remaining section or sections, so as to permit the operation of cleaning the electrodes to be performed in each section during a time of downflow of gas therein, and when such section is other than the last in the sequence of gas flow.

In this preferred form of apparatus, each section ordinarily comprises precipitating elements provided with discharge and collecting electrode means of any suitable type and passages for downflow or upflow of gas therethrough, and top and bottom compartments or headers. Means are provided for selectively establishing communication between the top headers of the respective sections and gas inlet and outlet flues or inlet and outlet compartments provided in the upper portion of the precipitator housing, and means are also provided for establishing communication between the bottom compartments of the respective sections. Vertical partition means are provided between the respective sections of each unit, and communication between the bottom headers is preferably provided by placing the space around or between the precipitating elements of each section in free communication with the bottom header thereof and providing opening means in said vertical partition means above the level of the lower ends of said precipitating elements so as to establish communication between said spaces around or between said precipitating elements in the several sections, whereby said spaces serve as re-distributing spaces for the gas as hereinafter described.

Suitable means are also provided for maintaining the necessary potential difference between the discharge and collecting electrode means, and each section is preferably connected thereto through a separate switch, whereby any section may be separately de-energized when it is desired to clean the high tension electrodes of such section, and separate cleaning means are also preferably provided for the respective sections, such cleaning means being of any suitable type and comprising, for example, means for rapping or jarring the discharge and collecting electrode means to dislodge precipitated material therefrom.

While the apparatus described in the preceding paragraph may consist of only two sections, it is not limited to this number and may in general comprise any desired number of sections, provided with means for causing the gas to first flow downwardly in any of said sections and then flow upwardly in any other of said sections, and for reversing the direction of flow in any section, so that the gas is at different times caused to flow downwardly in each of the respective sections, while flowing upwardly in one or more of the other sections, so as to permit cleaning of the electrode means of each section during a period of downflow.

According to one particular embodiment of the invention, each precipitator unit comprises three sections of equal size, each of which may be alternatively connected to the gas inlet means or to the gas outlet means, and means for so controlling the inlet and outlet connections that the gas at any one time flows first downwardly in any one section and then upwardly in the other two sections, so as to maintain a relatively high velocity in the downflow section and a relatively low velocity in the upflow section. The advantages of this particular construction will be explained hereinafter.

While, as above stated, I prefer to provide for down and up flow of the gas in the precipitator, the invention is not limited thereto, and may also be applied to electrical precipitating apparatus in which the gas flows substantially horizontally or in any other manner. The invention is also unrestricted as to the type of electrode means employed, as well as the means for cleaning the same.

The accompanying drawings illustrate apparatus embodying my invention and referring thereto:

Fig. 1 is a horizontal section of one form of apparatus, taken on line 1—1 in Fig. 3.

Fig. 2 is a partly sectional plan view thereof taken on line 2—2 in Fig. 3.

Fig. 5 is a horizontal section of a similar apparatus provided with a modified form of precipitating elements or collecting electrode means, taken on line 5—5 in Fig. 6.

Fig. 6 is a vertical section on line 6—6 in Fig. 5.

Fig. 7 is a horizontal section of another modification on line 7—7 in Fig. 8.

Fig. 8 is a vertical section on line 8—8 in Fig. 7.

Fig. 9 is a horizontal section of an apparatus similar to that shown in Fig. 5, but provided with collecting electrodes of the plate type.

Fig. 10 is a wiring diagram showing the connection of a typical power supply means to the precipitating apparatus shown in Figs. 1 to 4 inclusive, Fig. 11 is a vertical section of a precipitator unit comprising three sections, taken on line 11—11 in Fig. 12.

Fig. 13 is a vertical section of another modification of the invention, on line 13—13 in Fig. 14.

Fig. 14 is a view at right angles to Fig. 13, showing one section of the apparatus in vertical section, and the other in elevation.

Fig. 15 is a horizontal section of the damper arrangement, on line 15—15 in Fig. 13.

Fig. 16 is a vertical section of the rapping means for the discharge electrode system in the last-mentioned form of the invention taken on line 16—16 in Fig. 13.

Fig. 17 is a section on line 17—17 in Fig. 16.

Fig. 18 is a horizontal section of a precipitating apparatus of the horizontal gas flow type, according to my invention, taken on line 18—18 in Fig. 19.

Fig. 19 is a vertical section on line 19—19 in Fig. 18.

Fig. 20 is a vertical section on line 20—20 in Fig. 18.

Fig. 21 is a vertical section on line 21—21 in Fig. 19.

Fig. 22 is a horizontal section of another form of horizontal gas flow precipitating apparatus, taken on line 22—22 in Fig. 23.

Fig. 23 is a vertical section on line 23—23 in Fig. 22.

Fig. 24 is a semi-diagrammatic perspective view of the damper operating means of the apparatus shown in Fig. 22 and Fig. 23, but with the damper in reverse positions to those shown in Fig. 23.

Figure 3:
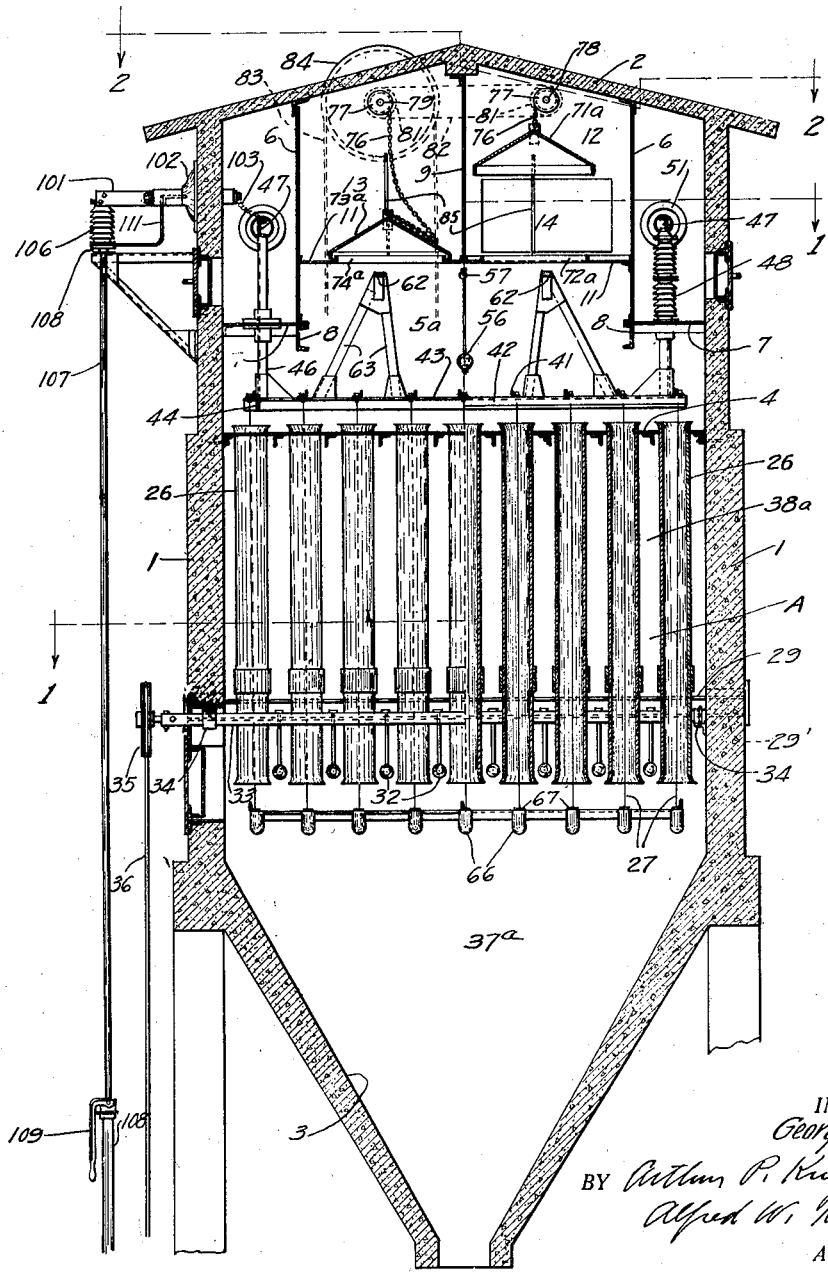
Fig. 3 is a vertical section of such apparatus on line 3—3 in Fig. 1.

The apparatus shown in Figs. 1 to 4 inclusive, and whose electrical supply means is shown in Fig. 10, consists of one typical precipitator unit according to my invention, and comprises a housing formed of concrete or any other suitable structural material and including side walls 1, roof or top wall 2 and a hopper or other suitably shaped bottom 3. A vertical partition plate 21 of concrete or other suitable structural material is provided midway between two opposite side walls of the housing, and serves to divide the interior thereof into two separate sections or chambers A and B. A horizontal partition plate 4 extends across each section, between the side walls and partition 21, so as to provide upper headers or distributing chambers 5a and 5b for the respective sections above said partition plates. Vertical partition plates 6 extend downwardly from the roof, while horizontal partitions 7 extend from the bottom of the respective plates 6 to the side walls to provide compartments for mounting of the insulating supports for the discharge electrodes as hereinafter described. Said vertical and horizontal partition plates 6 and 7 may be supported by horizontal beams or supporting members 8. A central vertical partition 9 and horizontal partition 11 serve to provide separate inlet and outlet compartments 12 and 13 respectively, the inlet compartment 12 being provided with an opening 14 to which is connected an inlet flue 16, and the outlet compartment 13 being provided with an opening 17 to which is connected an outlet flue 18. Vertical partitions 6 and 9, and hence the inlet and outlet compartments 12 and 13, extend transversely to the partition 21, so that each of said compartments extends across above both sections A and B.

The vertical partition plate 21 extends from near the bottom of the hopper 3 upwardly to the horizontal partitions 7 and 11. The hopper 3 is preferably provided with a single opening 22 for discharge of collected material, and the partition 21 terminates somewhat above said opening as indicated at 23, so as to permit material from both sections to be delivered through said opening, it being understood that in operation there will be maintained in the hopper a body of material of sufficient depth to cover the lower end of said partition and substantially prevent flow of gas therebetween from one section to the other. Instead of the above arrangement, a separate hopper, with a separate discharge opening, may of course be provided for each section A and B, if desired.

A plurality of precipitating elements extend downwardly from the horizontal partition 4 in each section. Such precipitating elements are shown in this case as comprising collecting electrodes 26 formed as vertically disposed open ended round tubes or pipes having their upper ends projecting through the partition 4, and opening into the upper headers 5a and 5b, so as to permit passage of gas therethrough, and discharge electrodes 27, such as fine wires, rods or the like, disposed centrally within the respective collecting electrodes. The collecting electrodes may be supported in any suitable manner, but are shown as supported by means of small lugs or brackets 28 secured thereto and resting upon supporting beams 29, said beams being in turn supported upon the side walls 1 as indicated at 29' in Fig. 3. U-bolts 31 are also passed around the collecting electrode pipes and secured to the beams 29, so as to hold said pipes in proper alignment.

The rapping means for the collecting electrodes of the respective sections may comprise a series of rapping hammers 32 mounted upon shafts 33, journaled in bearings 34 and projecting through the housing at one end and provided with pulleys 35 over which pass chains, ropes or other suitable means 36 for effecting rotation or swinging of said shafts, so as to cause the hammers 32 to deliver upward blows against the undersides of the several supporting beams 29. As shown, each supporting beam supports two rows of collecting electrodes, one at each side thereof, and each shaft 33 is disposed midway between and parallel to two adjacent supporting beams, so that each shaft serves to rap four rows of collecting electrodes. The pulleys or other operating means for the rapping means of the respective sections are separately operable.

The spaces, such as shown at 37a, beneath the lower ends of the precipitating elements of the respective sections, constitute lower headers for said sections, for receiving the gas from, or delivering the gas to, said precipitating elements, while the spaces 38a and 38b, between and around the precipitating elements of the respective sections constitute re-distributing chambers for the gas, as will be hereinafter described. Communication between said chambers 38a and 38b is provided by one or more openings 39 in the partition 21, above the lower ends of the precipitating elements.

The discharge electrodes 27 of each section are shown as suspended from a suspension frame mounted in the upper header or distributing chamber 5a or 5b and comprising transverse bars or members 41 and longitudinal bars or members 42. Each of these suspension frames is loosely mounted upon a fixed supporting frame comprising longitudinal bars 43 and transverse bars 44, and these last mentioned frames are hung by means of vertical channels 46 from horizontal channels or supporting beams 47, which rest at their ends upon insulating supports 48 mounted upon the horizontal plates 7. The vertical channel members 46 extend through openings 49 in said plate 7, while the horizontal supporting bars 47 extend through openings 51 in partitions 52, the partition plates 7 and 52 serving to doubly protect the insulating supports 48 from access of dust or other foreign matter carried by the gases being treated. Partition plates 53 are also provided between the insulator compartments 54a and 54b of the respective sections, so as to prevent flow of gas from one section to the other through these compartments.

For rapping the high tension or discharge electrodes of each section a single hammer 56 may be mounted upon a shaft 57 journaled in bearing means 58 and projecting at one end through the housing and provided with a pulley 59 over which passes a chain, rope, or other suitable operating means 61. The hammer 56 is adapted to strike at each side, upwardly against an anvil member 62 secured by means of bars 63 to the longitudinal members 42 of the corresponding suspension frame. It is evident that by rocking the shaft 57 by the operating means 61, the hammer 56 may be caused to strike first one and then the other of the anvil members 62, and as the suspension frame is loosely mounted on the supporting frame consisting of bars 43 and 44, it will be free to be lifted upward slightly at each blow and then fall back upon the supporting frame. This imparts a very effective jarring action to the entire electrode system of that section of the precipitator.

The discharge electrode members 27 are provided with tensioning weights 66 at their lower ends, and a spacing frame is also preferably provided consisting, for example, of transverse bars 67 resting upon said weights, and longitudinal bars 68 secured thereto.

The means for controlling communication between the inlet and outlet compartments 12 and 13 and the respective upper headers 5a and 5b comprise dampers 71a and 71b mounted in the inlet compartment 12 and adapted to be lowered into or raised out of position to close openings 72a and 72b in the horizontal partition plate 11, said openings establishing communication between said inlet compartment and the respective upper headers 5a and 5b, and dampers 73a and 73b mounted in the outlet compartment 13 and adapted to be lowered into or raised out of position to close openings 74a and 74b in partition 11, said last named openings serving to establish communication between said outlet compartment and the respective headers. Means are provided for alternately closing and opening the inlet dampers for the respective sections and for also alternately closing and opening the outlet dampers of the respective sections. Furthermore, I prefer to provide means whereby a single operation serves to effect operation of all four dampers to reverse the direction and sequence of gas flow through the sections, and the construction is preferably such that said single operation serves first to close the two dampers which were formerly open and then to open the two dampers which were formerly closed. The operating means for this purpose may comprise chains or other suitable lifting members 76 secured to the respective dampers and wound upon drums 77. The lifting chains of the two inlet dampers 71a and 71b are wound in opposite directions upon their respective drums, as indicated in Fig. 2, as are also the lifting chains for the two outlet dampers 73a and 73b. The drums 77 for the two inlet dampers are mounted upon a shaft 78 while the drums for the two outlet dampers are mounted upon shaft 79, said shafts being interconnected for simultaneous rotation by means of sprockets 81 and chain 82. One of the shafts, such as the shaft 79, is also provided with means for effecting rotation thereof, such as pulley 84 and a chain or cable 83 or the like passing over said pulley and extending downwardly to a suitable position for manual operation. The chains 76 are provided with a certain amount of slack, so that upon rotation of said shafts, the two dampers which were open will be lowered to closed position, before such slack is taken up, and raising of the other dampers to open position begins. Guide means are also provided for the dampers, said guide means being shown as comprising vertical rods 85 secured to the housing in any suitable manner, and notched lugs 85' mounted on the dampers.

Any suitable means may be provided for supplying electric power to the precipitator for maintaining the necessary potential difference between the discharge and collecting electrodes. Such means may comprise, for example, as shown in Fig. 10, a step-up transformer 86 whose primary winding may be connected by wires 87 to a suitable source of alternating current at ordinary voltage, say 220 or 440 volts, and a mechanical rectifier 88 consisting, for example, of an insulating disc 89 rotating in synchronism with the alternating current supply and provided with two contact shoes 90 adapted to make connection between different adjacent pairs of the four contact members 91, 92, 93, and 94. Two diametrically opposed contact members 91 and 93 are connected to the second winding of transformer 86, while one of the remaining contact members 92 is connected through wires 96 and switches 97 to the discharge electrode means of the respective sections, while the other contact member 94 is connected as by wires 98 to the collecting electrodes systems of both sections. Said last-named contact member and the collecting electrodes are also preferably grounded as indicated at 99, so that the entire collecting electrode system, supporting means, and other conducting parts connected therewith are substantially at zero potential with respect to the ground.

Figure 4:
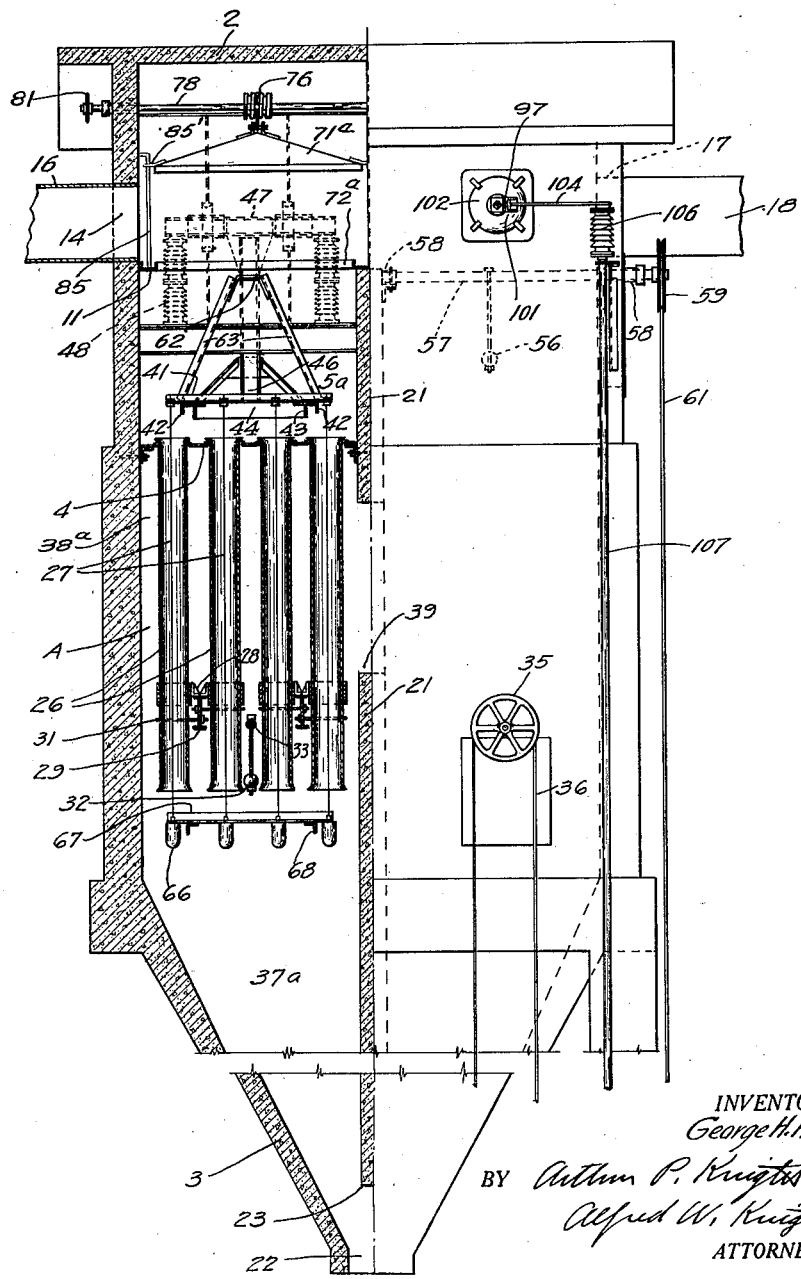
Fig. 4 is a partly sectional side elevation thereof on line 4—4 in Fig. 1.

Each of the high tension switches 97 aforesaid may comprise, as shown in Figs. 2, 3 and 4, a fixed contact arm 101 mounted upon an insulating bushing 102 extending through a side wall of the housing and connected by a rod or other conductor extending therethrough to the wire 103 connected to some portion of the supporting means for the discharge electrodes, such as bar 47 (see Fig. 3), and a movable contact arm 104 to which the wire 96 is connected. Said movable contact arm may be mounted by means of an insulating support 106 upon the upper end of an operating rod or shaft 107 rotatably supported in upper and lower bearings 108. Said rod may be provided with a handle or lever 109 which may be swung down to an out-of-the-way position alongside the rod, as shown, or may be raised to a horizontal position, so as to act as a lever for rotation of said rod. A grounding contact arm 111 is also preferably mounted on rod 107 beneath the insulating support 106, said arm being offset so that the outer end thereof is at the same level as the contact arm 104. By rotating rod 107 90° in the proper direction, the discharge electrode system is first disconnected from the high tension wires 96 and is then grounded through arm 111 and rod 107, upon engagement of said arm 111 with the fixed contact arm 101.

The operation of the above described apparatus is as follows: With both high tension switches 97 in closed position, and with the dampers in the position illustrated, the gas to be treated and containing suspended material to be removed therefrom by precipitation will be delivered through inlet flue 16 to inlet compartment 12, whence it will pass through opening 72a into the upper header 5a. The gas will then pass downwardly through the several precipitating elements of section A to the lower header 37a, then up through the distributing space 38a around the outside of said precipitating elements of this section and through opening 39, and then down through space 38b around the outside of the precipitating elements of section B to the lower header thereof. In passing up through the space around the precipitating elements of the first section and down through the corresponding space in the second section, the gas will be caused to be distributed substantially uniformly around the lower ends of all the precipitating elements of the second section, so that said spaces serve to provide re-distribution of the gas and prevent passage of an undue proportion of the gas through the precipitating elements closest to the dividing partition 21.

The gas then passes upwardly through the precipitating elements of section B to upper header 5b, thence through opening 74b to outlet compartment 13, and is finally delivered through outlet flue 18 in cleaned condition.

The cleaning of the gas is effected principally through precipitation of the dust or other suspended matter on the interior surfaces of the collecting electrode pipes 26, due to the action of the electric field, in well known manner. There is in general, however, some precipitation or collection of dust on the discharge electrodes 27. Some dust is also collected by gravitative settling into the hopper 3, the separation in this manner being promoted by the two reversals in vertical direction of flow of the gas. The gas passing down through the precipitator tubes of the first section is reversed in direction to pass up around said tubes, while the gas passing down around the tubes in the second section is again reversed in direction before passing up through these last named tubes, and at each of these reversals there is a tendency for some of the suspended particles to continue in their downward movement and thus be separated from the main gas stream. Some of the precipitated material collecting on the collecting electrode surfaces, and to a less extent on the discharge electrode members, will fall off or be dislodged by the gas stream and fall by gravity into the hopper 3. There is of course a tendency for the precipitated material thus dislodged from the electrodes to be again picked up by the gas stream and carried away. Such material, however, is in general agglomerated to a certain extent and is more readily susceptible to separation than the original suspended material, and such material arising from the first section will be largely separated from the gas by the effect of the above described reversals of gas flow and thus collected in the hopper, while that which is not so separated is substantially wholly precipitated in the second section of the precipitator. In view of the fact, however, that the gas leaving the electrodes of the second section passes substantially directly and without further separating action into the outlet flue, it is desirable to keep the electrode surfaces of this section as clean as possible at all times, thus minimizing the return of precipitated material to the gas stream in this section and also maintaining a highly efficient precipitating action therein due to the clean condition of the electrodes.

An important advantage of the above described precipitating apparatus is that the electrodes of the precipitator section through which the gas is passing downwardly may be cleaned whenever desired, without interrupting the gas flow, and when the electrodes of the other section, through which the gas is at that time passing upwardly to the outlet flue, become laden with precipitated material to such a point as to impair the effective operation thereof in producing maximum cleaning of the gas, the direction and sequence of gas flow may be reversed, and the electrodes of such other section may then be cleaned. For example, with the gas flowing in the direction above described, when the electrodes of section A should become laden with precipitated material to such an extent as to interfere seriously with the operation of the precipitator, or if for any reason it is desired to clean such electrodes, the power supply to the downflow section (section A in this case) may be shut off by turning shaft 107 to open the switch 104 for that section and bring the grounding switch 111 thereof into closed position, and the collecting and discharge electrode means of section A may then be cleaned by operation of the respective rapping means therefor. Operation of the rapping means for the collecting electrodes is effected by manipulating cable or chain 36 so as to swing the hammers 32 first in one direction and then in the other and cause the same to strike upwardly against the supporting beams 29. Said supporting beams, being loosely mounted at their ends, so as to permit upward movement thereof, yield sufficiently under these upward blows to transmit an effective jarring action through the lugs 28 to the respective collecting electrode pipes 26, so as to dislodge collected material therefrom. For rapping the discharge electrodes, the cable or chain 61 is manipulated to swing hammer 66 first in one direction and then in the other, causing the same to strike upwardly against the respective anvil members 62, the resulting upward force being transmitted through the bars 63 to the suspension frame of the discharge electrodes. As an upward force is thus delivered alternatively to the respective end portions of said suspension frame, the same is lifted slightly off of the supporting frame consisting of bars 43 and 44 and allowed to fall back thereon, thus producing an effective jarring action of the entire discharge electrode system and dislodging collected material therefrom.

It will be noted that the section of the precipitator which is rapped in this manner is the section in which the gas is passing downwardly so that the major portion of the material thus dislodged from the electrodes will be carried down by the combined action of the gas stream and the force of gravity, and the separation thereof from the gas stream and collection in the hopper will be promoted by the two reversals of flow of the gas as above described and by the subsequent passage of the gas through the precipitating elements of the other section.

When section A has has thus been sufficiently cleaned, the power supply may be restored thereto by again closing switch 104, and the operation will proceed as before. When the electrodes of the other section (section B in this case) are no longer sufficiently clean to give the desired cleaning of the gas, or when for any reason it is desired to clean the electrodes thereof, the direction and sequence of gas flow may be reversed, by manipulating the chain or cable 83, so as to rotate both shafts 78 and 79 in a counter-clockwise direction in Fig. 3. Such rotation of these shafts will first operate to lower the dampers 71a and 73b to closed position, but the gas flow will only be interrupted momentarily, for further rotation of said shafts will immediately operate to open the dampers 71b and 73a, the chains 76 being so arranged that the slack in the chains for the two dampers last mentioned is taken up at substantially the time the other two dampers reach closed position.

The above operation of the dampers causes the direction and sequence of gas flow through the respective sections of the precipitator to be reversed, so that the gas passes downwardly through the precipitating elements of section B and then upwardly through the precipitating elements of section A in exactly the reverse of the manner above described. The precipitating action continues as before, it being evident that by the above described operations the gas is again caused to flow upwardly to the outlet flue through precipitating elements which are in clean condition. The flow of gas in this direction may be continued, and the electrodes of the downflow section (now section B) may be cleaned whenever desired, until it is again desired to again reverse the direction of gas flow, so as to permit cleaning of the electrodes of the other section (section A in this case). The opening of the electric circuit for section B and the cleaning of the electrodes thereof is effected in the same manner as described above for section A, while manipulation of the chain or cable 83, so as to rotate shafts 78 and 79 in a clockwise direction in Fig. 3, will again reverse the position of the dampers.

It is evident that the electrodes of the downflow section may be rapped at any time when it may appear desirable. For example, if the electrodes of the downflow section should accumulate sufficient collected material to require cleaning, while the electrodes of the upflow section are still sufficiently clean to provide an effective final cleaning of the gas, the power may be shut off from the downflow section and the electrodes thereof cleaned as above described, and the power then re-applied, without disturbing the direction of gas flow.

It will be observed, however, that in any case the interruption of the circuit and the cleaning of the electrodes is preferably carried out in the section through which the gas first passes, so that the final or upflow section is always effective for precipitating purposes, so as to substantially prevent or greatly minimize the loss of suspended material through the outlet which would otherwise result if it were attempted to shut town a portion of the precipitator and clean the electrodes thereof without interrupting the gas flow.

As the precipitated material tends in general to build up more rapidly on the collecting electrodes than on the discharge electrodes, it may sometimes be desirable to rap the collecting electrodes of each section continuously, or at frequent intervals, during the period of downflow of gas therethrough, it being unnecessary to de-energize such section for this purpose; the rapping of the discharge electrodes, accompanied by the de-energization of that section of the precipitator, may then be carried out only at longer intervals or, for example, just before reversing the direction of gas flow from down to up.

It is evident that the collecting or discharge electrodes of each section may, if desired, be also rapped during upflow of gas therethrough, but, as pointed out above, this practice would be open to the objection that the material thus dislodged might be largely carried on out through the outlet flue.

The application of my invention to a precipitator of the so-called square pipe type is illustrated in Figs. 5 and 6. It will be understood that the upper portion of the precipitator, including the inlet and outlet compartments and the dampers, as well as the means for supporting and rapping the discharge electrodes, is substantially the same as in the form of the invention first described. The precipitator housing is divided as before by partition 21 into sections A and B and is provided with a hopper 3 for receiving the material collected in both sections. The precipitating elements comprise in this case, however, a plurality of plates 115 having alternating plates or strips 116 secured to and projecting perpendicularly from alternate plates 115, so as to form square or rectangular gas passages 117. The walls of said passages, including plates 115 and strips 116, constitute the collecting electrode means. The discharge electrode members 27 extend as before substantially centrally through the respective gas passages 117. The collecting electrode means 115 and 116 may be supported at their upper end on beams 121 and 122 and suitable means such as hammers 123 may be provided for delivering upward blows against the beams 121 for rapping the collecting electrodes. Partition plates 124 close off the spaces 126a and 126b around the precipitating elements from the upper headers 5a and 5b respectively, the spaces 126a and 126b serving as re-distributing spaces in the same manner as the spaces 38a and 38b in the form of the invention first described. Communication between these re-distributing spaces is provided as before by an opening 39 in the partition 21. Apart from the construction of the collecting electrodes, the main distinction between this form of the invention and the one shown in Figs. 1 to 4, is that the spaces 126a and 126b for re-distribution of the gas are provided wholly around the outside of the precipitating elements instead of around and between said elements, this being for the reason that this so-called square pipe construction is such as to provide no spaces between adjacent precipitating elements.

The operation of this form of the invention is substantially the same as in the form first described, the gas passing first downwardly through the precipitating elements of one section, for example section A, then upwardly in the space 126a around said elements, through opening 39, then down in the space 126b of the other section, and finally up through the precipitating element of said other section. Furthermore, the rapping of the electrodes, and the manipulation of the dampers to reverse the direction of flow of the gas, are carried out in the same manner as before.

Another form of square pipe precipitator according to this invention is shown in Figs. 7 and 8. The construction of this form of apparatus is substantially the same as that shown in Figs. 5 and 6, with the exception that no provision is made for utilizing the spaces around the precipitating elements for re-distribution of the gas. The collecting electrodes are, as before, formed by plates 115 and strips 116, defining rectangular gas passages 117 therebetween, in which are hung the discharge electrodes 27. In this case, however, communication between the two sections A and B is provided by means of an opening 39' in the partition 21 below the level of the lower ends of the precipitating elements, so that the gas passes directly between the lower headers 37a and 37b of the respective sections. An advantage of this form of construction is that, since the space around the precipitating elements is not utilized for re-distribution of the gas, said precipitating elements may, as shown, practically fill the interior of the housing, thus providing maximum capacity in an apparatus of a given size. The opening 39' may be placed sufficiently below the lower ends of the precipitating elements to provide for substantially uniform distribution of gas through all of said elements and said opening may be made sufficiently small to somewhat restrict the gas flow therethrough, so as to further promote such uniform distribution.

The operation of this form of the invention is similar to that above described with the exception that the gas is only subjected to one reversal in direction, and the re-distribution thereof is effected in a different manner. The advantages arising from the possibility of reversing the direction of flow in the respective sections, so as to permit the cleaning operation to always be conducted on the downflow section are, however, substantially the same as in the preceding forms of the invention.

The precipitator shown in Fig. 9 is similar to that shown in Fig. 5 but represents the application of my invention to a precipitator of the plate type, that is, in which the collecting electrodes are formed as plates. In this case also the precipitator housing is divided by partition 21 into two sections A and B, and is similarly provided with a hopper at the bottom for receiving the material collected in both sections. The collecting electrodes in this case comprise a plurality of spaced parallel plates 130 between which are disposed rows of wires or other suitable discharge electrodes 131. The ends of the gas passage spaces 132 between said plates are closed by end plates 133 and the entire group of precipitating elements occupies an area somewhat less than the area of the respective sections, so as to provide re-distributing spaces 134a and 134b, connected as before by opening 39 in partition 21. Aside from the substitution of parallel plates instead of the square pipe arrangement, the construction and operation of this form of precipitator may be substantially the same as shown in Figs. 5 and 6.

Figure 12:
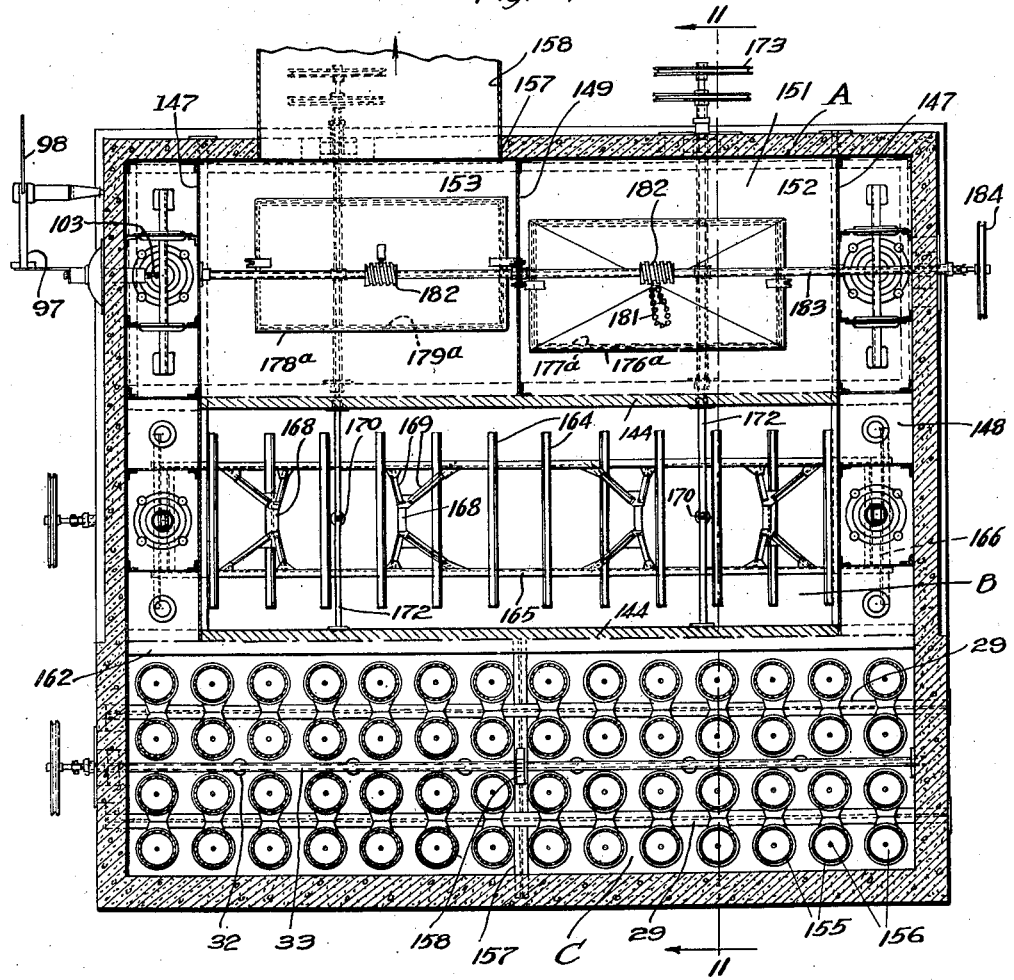
Fig. 12 is a horizontal section on line 12—12 in Fig. 11.

Still another modification of the invention is illustrated in Figs. 11 and 12, in which the precipitator is divided into three equal sections A, B, and C, and provision is made whereby any one of said sections may be connected to the inlet flue while the other two sections may be connected to the outlet flue, so as to at all times provide for downflow of gas between the electrode means of one section followed by upflow thereof through the other two sections. This particular feature may be adapted to any of the forms of construction above described, but I have shown it in connection with a precipitator of a type similar to that shown in Figs. 1 to 4 inclusive, in which the collecting electrodes are formed as round pipes and in which provision is made for utilizing the spaces around and between the precipitating elements of the respective sections to effect re-distribution of the gas before passage thereof through the upflow sections.

The apparatus shown comprises a housing of concrete or other structural material and including side walls 141, roof or top wall 142, and a bottom 143 formed as a collecting hopper. Two vertical partition plates 144 are equally spaced between two opposite side walls 141, so as to divide the interior of said housing into the sections A, B, and C. A horizontal partition plate 145 extends across each section between the side walls and the respective partitions 144, so as to provide upper headers or distributing chambers 146a, 146b and 146c for the respective sections above said partition plates. Vertical partition plates 147 extend downwardly from the roof while horizontal partitions 148 extend from the bottom of the respective plates 147 to the adjacent side walls to provide compartments for mounting of the insulating supports in substantially the same manner as in Figs. 1 to 4 inclusive. A central vertical partition plate 149 and horizontal partition plates 151 cooperate with the plates 147 and with the roof of the housing to provide separate inlet and outlet compartments 152 and 153, the inlet compartment 152 being provided with an opening 154 to which is connected inlet flue 156 and the outlet compartment 153 being provided with an opening 157 to which is connected outlet flue 158. The vertical partitions 147 and 149 extend transversely to the partitions 144, so that inlet compartment 152 and outlet compartment 153 both extend across above all of the sections A, B, and C.

The precipitating elements of each section, are shown in this case as comprising round pipe collecting electrodes 155 and wire or fine rod discharge electrodes 156 suspended centrally therein, although it will be understood that any of the other forms of precipitating elements above described may be used equally well in connection with this form of the invention. The collecting electrodes may be supported in substantially the same manner as above described in connection with Figs. 1 to 4, and the same form of rapping means therefor may also be used. In view, however, of the length of each section in the apparatus shown in these figures, the supporting beams 29 for the collecting electrodes are in this case shown as supported at their mid-points upon beams 157, in addition to being supported at their ends upon the side walls of the housing in the manner above described in connection with the first form of the invention. An additional central support and bearing 158 for the shaft 33 carrying the rapping hammers 32 for each section is also mounted upon the central supporting beam 157.

The lower headers of the respective sections are indicated at 160a, 160b and 160c, while the spaces 161a, 161b and 161c around and between the precipitating elements of the respective sections are utilized as before for redistribution of the gas in its passage from the precipitating elements of the downflow section to those of the upflow sections. Communication between these re-distributing spaces is provided by the openings 162 in the respective vertical partition walls 144.

The discharge electrodes 156 of each section are shown as hung from the transverse members 164 of a high tension supporting frame, said frame comprising in addition longitudinal members 165 and end members 166. The high tension supporting frames are mounted upon insulating supports in the compartments above mentioned, in substantially the same manner as in Figs. 1 to 4 inclusive. The rapping means for the discharge electrodes are also similar to those above described. However, on account of the length of the section, each high tension supporting frame is shown as provided with two pairs of anvil members 168 secured thereto by means of bars 169, and a hammer 170 is mounted in position between the two anvils of each pair, so as to be swung to strike first one and then the other of said anvils. The rapping hammers 170 for each of the outside sections A and C are shown as mounted upon hollow shafts 171 provided as before with suitable pulley and chain operating means, while the hammers for the intermediate section B are mounted upon shafts 172 which extend out through the hollow shafts 171 of one of the other sections and are provided at their outer ends with pulleys 173 and chains 174.

The lower ends of the discharge electrodes may be spaced and tensioned in the same manner as above described.

The means for controlling communication between the inlet and outlet compartments 152 and 153 and the upper ends of the respective sections may comprise dampers 176a, 176b, and 176c located in the inlet compartment 152 and adapted to be lowered into or raised out of position to close openings 177a, 177b, and 177c establishing communication between said inlet compartment and the respective upper headers, and corresponding dampers mounted in the outlet compartment 153, one of said last named dampers being indicated at 178a in Fig. 12, for controlling openings such as 179a, between the respective upper headers and said outlet compartment. Means are provided for reversing the positions of the two dampers for each section, preferably independently of the other sections. For this purpose the dampers may be raised or lowered by chains 181, the chains for the two dampers of each section being wound in reverse directions upon drums 182 on a shaft 183, which extends through the housing at one end and is provided with pulley 184 and operating means such as chain 185. As before, chains 181 are preferably provided with sufficient slack so that the dampers which were open will be moved to closed position before opening of the other dampers begins.

In this case also the discharge electrode system of each section is separately connected, as before, to the source of high tension current, as through wires 103 and 98, and separate switching means 97 are preferably provided in each of such connections, so that any one section may be deenergized in order to permit rapping of the discharge electrodes thereof.

In the operation of this form of apparatus the gas to be treated passes first downwardly through the precipitating elements of one section and then upwardly through the precipitating elements of the other two sections. For example, with the inlet dampers in the positions shown in Fig. 11 and the outlet dampers in the reverse positions, the gas from inlet flue 152 passes through opening 177b, upper header 146b, downwardly through the collecting electrode pipes 155 of section B, then upwardly through the re-distributing space 161b of said section, then through the openings 162 into the re-distributing spaces 161a and 161c of the other two sections, and finally passes upwardly through the precipitating elements of said other sections, through the upper headers 146a and 146c thereof and thence through the corresponding openings into the outlet compartment 153.

All of the gas is, therefore, subjected to two successive precipitating actions, in the first of which it is passed downward at high velocity, and in the second of which it is passed upward at a relatively low velocity, the velocity of upward passage being only one-half that of its downward passage. An advantage of this construction is that a large proportion of the suspended material is precipitated in the downflow section and collected in the hopper beneath the same or is agglomerated in such section and mechanically deposited in the hopper due to the reversal in the direction of flow of the gas between the downflow and upflow sections, while the remaining material is precipitated in the upflow sections, the relatively low velocity in these sections permitting a more complete final cleaning of the gas. The low velocity of upflow minimizes the tendency for precipitated or agglomerated material to be carried upwardly by the gas stream through the precipitating elements of these sections and into the outlet flue.

As in the other cases above described, the cleaning of the electrodes is preferably conducted on the downflow section only, such cleaning being carried out at any time during the period of downflow in each individual section. When the electrode means of one of the sections in which the gas is passing upwardly become so dirty as to require cleaning, the dampers of this section may be reversed, so as to connect the same to the inlet flue and close off connection therefrom to the off connection therefrom to the outlet flue. The dampers of the section in which the gas was previously passing downwardly may then be also reversed, so as to connect said last-named section to the outlet flue instead of the inlet flue. As in the other forms of the invention the slack in chains 181 permits the closing of one of the dampers for each section before the other damper for said section starts to open, so as to prevent by-passing of dirty gas through the upper header of that section from the inlet damper opening to the outlet damper opening. A further advantage of this three-section precipitator manifests itself at the time of this reversal in the position of the dampers, for there is at all times at least one section connected to the inlet compartment and at least one section connected to the outlet compartment, thus affording means for passage of the gas through the precipitator at all times, instead of necessitating even a momentary interruption of the gas flow as in the two-section precipitators above described.

Another modification of the invention is shown in Figs. 13 to 17 inclusive, in which the precipitating elements are of the exposed pipe type, in contra-distinction to the submerged pipe type. The several pipe electrode precipitators above described are all of the submerged pipe type, in which the collecting electrode pipes are enclosed within the outside housing. In the exposed pipe type, on the other hand, no housing is provided around the collecting electrode pipes, so that the same are exposed to atmospheric cooling, a feature which has been found to be quite advantageous in certain cases. In addition to eliminating the housing otherwise required, this type of precipitator has the further advantage, when collecting materials of relatively low electrical conductivity, that the cooling of the electrode pipes promotes condensation of sufficient moisture on the material deposited on the collecting surfaces to render such deposit sufficiently conductive for the most effective operation of the precipitator.

The apparatus shown in these drawings comprises a lower header 190 having a hopper 191 for receiving the precipitated material, and an upper header 192, said headers being supported by vertical beams 193. The upper header 192 is divided by partition plate 194 into two separate compartments 192a and 192b, and a baffle plate 197 may be provided extending downwardly in hopper 191 to a suitable distance below the top plate 196 of the lower header so as to provide for proper redistribution of the gas before entering the second section, but leaving an opening beneath said baffle plate for passage of gas from one section to the other. The precipitating elements are, as before arranged in two sections or groups A and B, and comprise vertical pipe collecting electrodes 198 communicating at their ends with the upper and lower headers respectively, and discharge electrodes, such as wires 199, hung from frames 201. The supporting frame for the discharge electrodes of each section is in turn supported by a hollow vertical rod 202 suspended from a horizontal beam 203 resting on insulating supports 204.

The upper header compartments 192a and 192b are connected by hoods 206a and 206b and elbows 207a and 207b respectively to diametrically opposite sides of a damper chamber 208. The inlet flue 210 and outlet flue 211 are connected to the two remaining diametrically opposite sides of said damper chamber, and a damper 212 is rotatably mounted in said chamber so as to be movable into position against either diagonally opposite pair of partition plates 213 or 214 so as to reverse the connection between the inlet and outlet flues and the elbows 207a and 207b leading to the respective sections of the precipitator. The shaft 215 of damper 212 may be provided with suitable operating means, such as pulley or sprocket 216 which may be driven in any suitable manner.

The supporting beams 203 and insulating supports 204 for the discharge electrode systems of the respective sections may be mounted in separate compartments 218 enclosed by bottom plate 219 and side walls 220, said side walls converging at their upper ends to an apex 221. Sufficient space is left at the sides of the housings thus formed, for passage of gas therethrough. The housing means 219 and 220 thus serve to protect the insulating supports from direct exposure to the gas stream and the suspended material carried thereby. The hollow supporting rod 202 may project up through an opening 223 in the bottom plate 219, said opening being covered by a cap 224 of insulating material, through which said rod also passes.

The rapping means for the collecting electrodes comprise hammers 228 mounted on shafts 229, which may be operated in any suitable manner to rap or jar the respective collecting electrode pipes. In the actual construction shown, there are three shafts 229 for each section, and the two outer shafts are connected by links 226 to the central shaft, which is provided with lever 227, to which chains or the like may be connected for swinging the hammer in either direction.

In order to permit continuous rapping of the discharge electrode system, so as to maintain the discharge electrodes 199 substantially free from suspended material at all times and thus provide a maximum electrical discharge therefrom, I have shown in connection with this apparatus a form of rapping means in which the parts contacting the discharge electrode system to effect the rapping action are insulated from the ground and from the precipitator housing and all parts electrically connected thereto, so that the rapping operation will not disturb the potential of the discharge electrodes. Such rapping means are shown as comprising a shaft 231 rotatably mounted in a bearing 232 on hood 206a or 206b and in bearings 233 mounted on supporting beam 203. Said shaft is provided at its outer end with means such as sprocket or pulley 234 through which it may be rotated in any suitable manner, as by means of electric motor indicated at 235, it being understood that any suitable speed reducing means may be provided between said motor and the shaft 231, so as to provide the desired speed of rotation of said shaft. Shaft 231 is provided with a section 237 of bakelite or other suitable insulating material. A vertical rapping bar 238 extends within the hollow supporting rod 202 (see particularly Fig. 16) and is slidably guided by a guide member 239 in said hollow rod and a guide bracket 240 mounted on supporting beam 203. The lower end of the hollow rod 202 is closed by a flexible diaphragm 241, as shown particularly in Fig. 17, and impact members 242 are secured to the respective sides of said flexible diaphragm. The rapping bar 238 normally rests at its lower end upon the impact members 242, while said impact members rest in turn upon an anvil member 243 secured to the discharge electrode supporting frame 201. The rapping bar 238 projects at its upper end through the horizontal supporting beam 203 and through the guide bracket 240, and is slotted as indicated at 244, while shaft 231 is provided with a cam 245 adapted to enter the slot 244 upon each revolution of said shaft in the direction indicated by the arrow in Fig. 16, and to engage the upper end of said slot, so as to lift the rapping bar 238 off of the impact member 242 and then allow the same to fall back thereon by gravity, thus imparting a sufficient blow to said impact member and hence to the anvil 243 to effect the necessary jarring of the discharge electrode members to dislodge deposited material therefrom.

Means for feeding lubricating oil to the bearings 233 are indicated at 248, said means being adapted to provide an intermittent drip of oil from the lower end thereof into suitable cups on said bearings, so as to supply the necessary lubricant without making any electrical connection thereto.

In the operation of this form of the invention, with the damper 212 in the position shown in Fig. 15, the gas entering through inlet flue 210 passes first downwardly through the precipitating elements of section B into the lower header 190, where it is deflected and then passes upwardly through the precipitating elements of section A and finally to the outlet flue 211. The rapping of the collecting electrodes is, as before, preferably carried out only in the section in which the gas is passing downwardly, that is, section B under the above conditions, and such rapping may be conducted continuously or from time to time throughout the period of downflow in such section, or may be conducted at any desired time during such period.

The rapping of the discharge electrodes is preferably conducted continuously by operation of the rapping means above described, and may be conducted either on both sections or only on the downflow section. When the discharge electrodes of both sections are continously rapped, the amount of material dislodged therefrom in the upflow section is so small as to cause no appreciable return of suspended material to the gas stream, and the continuous maintaining of the discharge electrodes in clean condition provides at all times for the maximum electrical discharge therefrom and hence a maximum efficiency of precipitation.

When it is desired to reverse the direction of flow of the gas through the precipitator, in order to permit rapping of the collecting electrodes of the other section, damper 212 is turned to its other position, as indicated in dotted lines at 212', whereupon the gas is caused to pass first downwardly in section A and then upwardly in section B, and the collecting electrodes of section A may then be rapped as desired.

A form of precipitating apparatus according to my invention, and adapted for horizontal flow of gas therethrough, is illustrated in Figs. 18 to 21 inclusive. The housing in this case comprises side walls 250 and 251 and end walls 252 and 253. A partition wall 254 extends throughout the height of the housing and from the end wall 252 to a point spaced somewhat from the other end wall, so as to provide two sections A and B and an end compartment 255 through which the gas may pass from one section to the other. The housing is also provided with a top cover 256, and with a hopper 257 provided with suitable means such as screw conveyor 258 for removal of collected material.

The collecting electrode means of each section may comprise spaced concrete plates 259 disposed vertically and longitudinally of the section, that is, parallel to the direction of gas flow therethrough. Said collecting electrode plates may be secured to and suspended from channels 261 at their upper ends which are in turn carried by supporting channels 262. Between the respective collecting electrode plates are disposed the discharge electrode means consisting, for example, of rows of parallel wires or small rods 264 secured at their upper and lower ends to rods 265. Said rods 265 may be supported at their ends by transverse frame members 266 carried by vertical channels or bars 267 which extend through openings 268 at the top of the housing and are suspended from main supporting bars 269 resting upon insulating supports 270.

The cleaning means for the collecting electrodes are shown in this case as comprising vertical scraping elements such as chains 272 hanging loosely at both sides of each collecting electrode and supported by a carrying bar 273. Said scraping elements may be held in against the faces of the collecting electrodes by tensioning means at their lower ends such as weights 274. The carrying bar 273 is shown as resting slidably upon the supporting channels 261 of the collecting electrodes, and suitable means are provided for moving said carrying bars and the scraping elements carried thereby horizontally throughout the entire length of the collecting electrodes. The means for this purpose may comprise longitudinal bars 276 secured to the carrying bar 273 for each section adjacent the ends thereof and extending at one end through openings in the main supporting channels 262, being preferably supported upon rollers 277. Beyond the outside supporting channel 262, and within the end compartment 255, said longitudinal bars are connected by a transverse bar 278, to a rod 279 extending through a bearing 280 in the end wall 253 and adapted to be reciprocated in any suitable manner, as by a hydraulic or pneumatic cylinder 281. It is evident that by alternate application of pressure at the opposite ends of cylinder 281, the rod 279 and hence the carrying bar 273 and chains 272 may be reciprocated, so as to drag said chains back and forth across the surfaces of the collecting electrode plates and dislodge precipitated material therefrom.

No cleaning means are shown in this case for the discharge electrodes, but it will be understood that any suitable or well known means may be employed for this purpose, for example rapping means similar to those shown in the other forms of the invention.

At the end opposite the compartment 255, section A is connected by flues 284 and 285 respectively to the inlet flue 286 and outlet flue 287, while section B is similarly connected by flues 288 and 289. Dampers 290 and 291 are provided in flues 284 and 285 respectively and are mounted perpendicular to one another upon a common shaft 292, so that when one of said dampers is closed the other is opened and vice versa. Similar dampers 293 and 294 are provided in flues 288 and 289, and are similarly mounted upon a common shaft 295, but in reverse positions to the dampers for the other section, so that in either position of the dampers one section is always in communication with the inlet flue and the other in communication with the outlet flue. The damper shafts 292 and 295 are preferably operated by a common shaft 296 driven in any suitable manner and operatively connected thereto as by bevel gears indicated at 297, so that operation of all four dampers to reverse the sequence of gas flow through the sections of the precipitator may be effected simultaneously.

Means such as above described in connection with the other forms of the invention are provided for connecting the discharge electrodes of the respective sections to the high tension side of a source of unidirectional current and for connecting the collecting electrodes to the low tension side thereof, so as to maintain the necessary high potential difference therebetween.

The features of reversing the order of gas flow through the respective sections and of cleaning the electrode means of the section through which the gas passes first are carried out in substantially the same manner in this case as in the other forms of precipitator above described. With the dampers in the position shown, for example, the gas to be treated passes from inlet flue 286 through flue 288, thence through section B, end compartment 255, and then through section A and out through flue 285 to outlet flue 287. An essential difference between this form of precipitator and those previously described above is that the gas flows substantially horizontally through the precipitating elements of the respective sections instead of vertically. In passing through end compartment 255, however, the gas is, as before, subjected to a reversal in direction, which will tend to cause any material dislodged from the electrodes of the first section during cleaning thereof and carried along by the gas stream to be thrown out by its own inertia during such reversal in direction of the gas stream. With the gas flowing in the direction above described, the operation of cleaning the electrodes is preferably carried out only in section B. When it is desired to clean the collecting electrodes, the chains or scraping elements 272 are dragged back and forth across the surfaces thereof to dislodge precipitated material therefrom. In case cleaning means are provided for the discharge electrodes, these cleaning means may also be operated in section B during this period.

When it is desired to reverse the direction of gas flow, so as to permit cleaning of the electrodes of section A, the positions of the dampers are reversed, so that the gas passes from inlet flue 286 first through section A and then back through section B to outlet flue 287, and the electrode cleaning means for section A may then be operated.

Another form of horizontal flow precipitator embodying the principles of my invention is shown in Figs. 22 to 24 inclusive. This apparatus comprises a housing including side walls 301 and 302 and end walls 303 and 304. Within this housing are provided three precipitator sections A, B, and C, adapted for passage of gas therethrough in series. End compartments 305 and 306 are provided at the respective ends of the series of sections. The top of the main precipitator housing is formed by cover plates 307 and by the insulator housings 308 in which are mounted the insulating supports for the discharge electrode systems of the respective sections. The bottom of the casing is formed as a hopper 309 for collection of the precipitated material.

Inlet flue 310 and outlet flue 311 extend alongside the precipitator housing at opposite sides thereof. Dampers 312 and 313 control communication between inlet flue 310 and the respective end compartments 305 and 306 while dampers 314 and 315 control communication between said end compartments and outlet flue 311. Said dampers may be of any suitable type but are shown as comprising multi-vane dampers adapted to slide vertically to closed or open position. Said dampers may be operated by means of cables 316 or the like extending over pulleys 317 and 318 to a motor driven hoist device 319. As shown diagrammatically in Fig. 24, in order to provide for simultaneous reversal in the position of all of the dampers, the lifting cables for inlet damper 312 and outlet damper 315 may be wound in one direction upon the winding drum 320 of hoist 319, while the lifting cables for inlet damper 313 and outlet damper 314 may be wound in the reverse direction thereon. In this figure the dampers 313 and 314 are in raised or open position while the dampers 312 and 315 are in lowered or closed position. Dampers 314 and 315 are shown in reverse positions, however, in Fig. 23.

The precipitating elements of the respective sections are shown in this case as comprising a plurality of collecting electrodes 325 of the rod-curtain type, each comprising a multiplicity of small vertical rods 326 hung from a supporting member 337, and a plurality of sets of discharge electrode members 327, such as wires or small rods hung vertically in rows between the respective collecting electrodes. The discharge electrode members may be supported on frames 328 carried by insulating supports 329.

The electrode cleaning means shown in connection with this apparatus comprise pneumatically operated rapping means for the collecting electrodes and manually operated rapping means for the discharge electrodes. For rapping the collecting electrodes, an anvil or impact member 330 is mounted on the top supporting member 337 of each collecting electrode, and a pneumatically operated hammer 331 is hung as by chain or cable 332 from a traveling carriage 333 carried by a supporting rail 334. A pneumatic hammer is provided for each section and is movable transversely thereof, upon rail 334, into position above the impact member 330 of any one of the collecting electrodes of that section. Said pneumatic hammers are connected by flexible hose connections 335 to a pipe 336 for supplying air under high pressure thereto, it being understood that said pneumatic hammers are provided with any suitable means for controlling the operation thereof. Each pneumatic hammer is preferably connected to its travelling carriage 333 through a spring balance 352 adapted to resiliently support the weight of the hammer, so as to facilitate movement and operation thereof.

The rapping means for the discharge electrodes comprise hammers 338 mounted on shafts 339, so as to swing upwardly and strike against the upper transverse bars 340 of the discharge electrode frames, and said hammers may be operated, for example, by means of belts or other driving members 341 passing over pulleys 342 on shafts 339 and pulleys 343 on shafts 344 provided with operating levers 345 for manual operation thereof.

The discharge electrode systems of the respective sections are connected by wires 347 to separate switches 348 and thence by wire 349 to the high tension side of any suitable source of power supply, for example such as above described, while the collecting electrodes are grounded in any suitable manner and connected to the low tension side of said source of power supply.

With the dampers in the positions shown in Fig. 24, the gas passes from inlet flue 310 to the end compartment 306 and then successively through the sections C, B, and A in the direction indicated by the arrow at 351. From the last of these sections the gas passes through end compartment 305 and thence to outlet flue 311. Under these conditions the discharge and collecting electrodes of section C and section B may be cleaned by operation of the rapping means above described. In this case it is necessary to open the switch 348, so as to de-energize each section during the rapping of the discharge electrodes therein. Any material dislodged from the electrodes in a section being cleaned, or failing to be precipitated due to interruption of the electric field in said section, is subjected to a further precipitating action before leaving the apparatus, so that little if any of such material will escape to the outlet flue. When cleaning the electrodes of section C the suspended material carried beyond said section is subjected to two stages of electrical precipitation in sections B and A, while when rapping section B the suspended material carried out of this section is subjected to a final precipitating action in section A. In this case the direction of the flow of gas is not reversed between its passage through the successive sections as in the other forms of apparatus above described. There is, however, a reversal in the direction of gas flow in passing from the last section to and through the end compartment and back in the outlet flue, and this reversal of flow will assist in depositing any agglomerated material which may escape the last section of the precipitator.

By operation of the hoist device 319 the positions of the dampers may be reversed, dampers 313 and 314 being lowered to closed position simultaneously with the raising of dampers 312 and 315 to open position. The gas will then pass from inlet flue 310 through end compartment 305 and through the precipitator sections in reverse order, that is, first through section A, then section B and then section C, whence it will pass through end compartment 306 to outlet flue 311. The electrode means of section A may then be cleaned, with the same advantages as before, while the electrode means of section B may also be cleaned during this period if desired. It is evident, therefore, that the electrodes of this intermediate section B may be maintained substantially free of deposited material at all times, for, regardless of the direction of flow of gas, such electrodes may be cleaned at any time due to the fact that there is always an active section of the precipitator between section B and the outlet flue.

I claim:

1. The method of electrical precipitation of suspended particles from gases which comprises passing gas to be treated and containing suspended particles successively through the precipitating elements of a plurality of precipitating sections, periodically varying the sequence of the gas flow through the several sections, and intermittently cleaning the precipitating elements of the respective sections, said cleaning operation being in each case carried out only in a section which is at that time other than the last section in order of gas flow, while maintaining a high potential electrical field, during any period, in the precipitating elements of the section which is at that time the last in order of gas flow, and also in the precipitating elements of each preceding section at least between the times of successive cleaning operations thereof.

2. The method of electrical precipitation of suspended particles from gases which comprises passing the gas to be treated and containing suspended particles successively through the precipitating elements of a plurality of precipitating sections, periodically varying the sequence of the several sections so as to cause the gas, at different times, to pass last through different ones of said sections, and cleaning the precipitating elements of a section other than the last section, while continuing the gas flow therethrough.

3. The method of electrical precipitation of suspended particles from gases which comprises passing the gas to be treated and containing suspended particles successively through the precipitating elements of two precipitating sections, periodically reversing the sequence of gas flow through said sections, and intermittently cleaning the precipitating elements of the section which is, during any period, the first section in order of gas flow, while maintaining a high potential electrical field, during any period, in the precipitating elements of the last section in order of gas flow, and also in the precipitating elements of the other section at least between the times of successive cleaning operations thereof.

4. The method of electrical precipitation of suspended particles from gases which comprises passing the gas to be treated and containing suspended particles successively through the precipitating elements of two precipitating sections, periodically reversing the sequence of gas flow through said sections, and cleaning the precipitating elements of only the section through which the gas at that time passes first.

5. The method of electrical precipitation of suspended particles from gases which comprises passing the gas to be treated and containing suspended particles first downwardly through a precipitating element and then upwardly through another precipitating element, periodically reversing the direction and sequence of gas flow through the two elements, and, while maintaining the flow of said gas through said sections, cleaning the electrodes of the precipitating element through which the gas is at that time passing downwardly.

6. The method of electrical precipitation of suspended particles from gases which comprises passing the gas to be treated and containing suspended particles first through one precipitating element comprising discharge and collecting electrodes and then through another similar precipitating element while cleaning the collecting electrode means of only the first of said elements, and subsequently reversing the sequence of gas flow through said precipitating elements and then cleaning the collecting electrode means of the other of said elements.

7. The method of electrical precipitation of suspended particles from gases which comprises passing the gas to be treated and containing suspended particles first downwardly through one precipitating element comprising discharge and collecting electrodes and then upwardly through another similar precipitating element while cleaning the collecting electrode means of only the first of said elements, and subsequently reversing the sequence and direction of gas flow through said precipitating elements and then cleaning the collecting electrode means of the other of said elements.

8. The method of electrical precipitation of suspended particles from gases which comprises passing the gas to be treated and containing suspended particles first downwardly through one group of precipitating elements, then upwardly around said precipitating elements, then downwardly around the precipitating elements of another group, and finally upwardly through said last named precipitating elements, periodically reversing the direction and sequence of gas flow through and around the precipitating elements of the two groups, and cleaning the precipitating elements of only the group in which the gas is passing downwardly, without interrupting the flow of such gas therethrough.

9. An apparatus for electrical precipitation of suspended particles from gases comprising a housing, vertical partition means defining a plurality of precipitator sections within said housing, precipitating elements within each of said sections and adapted for vertical flow of gas therethrough, the space within each section and around and outside the precipitating elements being in free communication with the space beneath the lower ends of said precipitating elements, partition means preventing direct communication between the space around the precipitating elements of each section and the space above the precipitating elements of that section, means for supplying gas to, and removing gas from, the apparatus, means controlling communication between the upper end of each section and said gas supplying and gas removing means, opening means in said vertical partition means above the lower ends of said precipitating elements, establishing communication between said spaces around and outside the precipitating elements and constituting the sole means of communication between the precipitator sections, and independently operable means for removing deposited material from the precipitating elements of the respective sections.

10. An apparatus for electrical precipitation of suspended particles from gases comprising two precipitator sections each comprising housing means and precipitating elements mounted within said housing means and adapted for vertical flow of gas therethrough, the space within each section and around and outside said precipitating elements constituting a re-distributing space and being in free communication with the lower ends of said precipitating elements, gas inlet and outlet means, means for controlling communication between said gas inlet and outlet means and the upper end of each of said sections, means establishing communication between the re-distributing spaces of the two sections, and independently operable means for removing deposited material from the precipitating elements of the respective sections.

11. An apparatus for electrical precipitation of suspended particles from gases, comprising two precipitator sections each comprising a housing and having a header compartment at each end and a plurality of precipitating elements extending between said header compartments, means establishing communication between the header compartments at one end of the two sections, gas inlet and outlet means, means controlling communication between said gas inlet and outlet means and the header compartment at the other end of each of the sections, and independently operable means for removing deposited material from the precipitating elements of the respective sections.

12. An apparatus for electrical precipitation of suspended particles comprising two sections each having a plurality of precipitating elements adapted for vertical flow of gas therethrough in parallel, means connecting the lower ends of the two sections for flow of gas therebetween, gas inlet means, gas outlet means, damper means controlling communication between said gas inlet and outlet means and the upper end of each section, means for reversing the position of said damper means, and independently operable means for removing deposited material from the precipitating elements of the respective sections.

13. An apparatus for electrical precipitation of suspended particles from gases comprising two sections each having an upper header and a lower header and a plurality of precipitating elements extending substantially vertically between said headers and communicating therewith, means establishing communication between the lower headers of the two sections, means defining separate gas inlet and gas outlet passages extending adjacent the upper headers of both of said sections, damper means controlling communication between said gas inlet and gas outlet passages and the upper headers of the respective sections, means for reversing the position of said damper means so as to alternately establish communication between the gas inlet and gas outlet passages and the upper headers of the respective sections, and independently operable means for removing deposited material from the precipitating elements of the respective sections.

14. An apparatus as set forth in claim 13, said means for reversing the position of said damper means comprising means operatively interconnecting all of said damper means and operable to first move the dampers which were previously open to closed position and to directly thereafter move the dampers which were previously closed to open position.

In testimony whereof I have hereunto subscribed my name this 12th day of February, 1929.

GEORGE H. HORNE.